United States Patent
Sobeski

(10) Patent No.: US 6,499,035 B1
(45) Date of Patent: Dec. 24, 2002

(54) LICENSING JAVA OBJECTS

(75) Inventor: David A. Sobeski, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/115,430

(22) Filed: Jul. 15, 1998

(51) Int. Cl.⁷ .............................................. G06F 17/00
(52) U.S. Cl. .................... 707/103 R; 707/102; 707/513
(58) Field of Search .......................... 707/103, 1–10, 707/100–102, 104, 200–206, 511.1–514; 705/59, 36; 713/200–201, 155, 190; 704/209; 709/229; 345/349

(56) References Cited

U.S. PATENT DOCUMENTS

| | | | | |
|---|---|---|---|---|
| 4,924,378 | A | | 5/1990 | Hershey et al. ............... 707/10 |
| 5,666,411 | A | * | 9/1997 | McCarty ..................... 713/190 |
| 5,708,709 | A | * | 1/1998 | Rose .......................... 713/155 |
| 5,790,664 | A | * | 8/1998 | Coley et al. ................ 709/203 |
| 5,893,118 | A | | 4/1999 | Sonderegger ............... 707/203 |
| 5,910,987 | A | | 6/1999 | Ginter et al. ................. 705/30 |
| 5,999,179 | A | * | 12/1999 | Kekic et al. ................ 345/349 |
| 6,056,786 | A | * | 5/2000 | Rivera et al. ............... 709/229 |
| 6,151,571 | A | * | 11/2000 | Pertrushin ................... 704/209 |
| 6,154,731 | A | * | 11/2000 | Monks et al. ................. 705/36 |
| 6,157,926 | A | * | 12/2000 | Appleman et al. .......... 707/102 |

OTHER PUBLICATIONS sunsite.tut.fi/javastation/partnernews/wyattriver.html.*
Santoso et al. "Building a Networked 3D Virtual Environment using VRML and Java", TENCON 2000, Proceedings, pp. 538–541, Sep. 2000.*
Nor et al., "Development of run–time UML for Java programming language", TENCON 2000, Proceedings, pp. 86–89, Sep. 2000.*
Lu et al., "An Agent–based Load Balancing Mechanisms: PLRM Using Java", TOOLS–Asia 2000, Proceedings, 36th International Conference on, 2000, pp. 176–181, Nov. 2000.*
http://sunsite.tut/javastation/partnernews/wyattriver.html, "Wyatt River Software Announces the Availability of Software Metering and License Enforcement Tools for Java Applications", Oct. 1996.*
Lovett, http://www.lists.ic.ac.uk/hypermail/xml–dev–Dec–1997/0147.html, "RE: *Validating* XML Parser Written written in Java?", Dec. 1997.*
Chappell, "ActiveX Controls," *Understanding ActiveX and OLE*, chapter 9, pp. 203–235 (1996).
French et al., "Software License Management in a Network Environment," Abstract of Conference Paper (1988).
Microsoft Corporation, "Registering, Licensing, and Upgrading an ActiveX Designer," *ActiveX Designer Programmer's Reference*, chapter 8, pp. 63–69 (1996).
Hauser, "Does Licensing Require New Access Control Techniques," *Communication of the ACM*, vol. 37, No. 11, pp. 48–55 (Nov. 1994).

* cited by examiner

*Primary Examiner*—David Jung
(74) *Attorney, Agent, or Firm*—Klarquist Sparkman, LLP

(57) ABSTRACT

The licensing of Java objects is in disclosed. In one embodiment, a computerized system includes a Java object, a license file, and a license manager. The license file is in associated with the Java object. The license manager validates the Java object, based on the license file.

31 Claims, 3 Drawing Sheets

LICENSING JAVA OBJECTS

FIELD

The invention relates generally to software components such as objects, and more particularly to licensing such objects.

BACKGROUND

Software components have become an increasingly popular manner by which to develop computer programs. Rather than write code from scratch, a programmer instead is able to utilize preexisting components that provide common functionality. This saves time and money in the development of computer programs. Common software component architectures include Java objects, such as JavaBeans, within the Java programming language, and Microsoft's Component Object Model (COM).

The use of software components means that developers may be able to sell or license their objects independent of computer programs. Thus, a developer may develop a given component, and then offer it for license or sale on the Internet, such that other developers may download the component and use it in their own programs. In addition, a given program may use components that are available from different sources, such that a user of the program may pay for the program itself, plus any third-party components utilized within the program.

A disadvantage to the creation of a marketplace for objects is that the prior art does not provide for a convenient manner by which to manage the selling or licensing of software components, particularly over the Internet. A developer may, for example, sell or license a component to another developer or an end user, but generally has little direct control over the use of that component once its code has been distributed. This means that the developer has to manage the distribution of his or her components, which may be a labor-intensive and cost-intensive endeavor. Furthermore, the lack of direct control means that there is great potential for piracy of the software component.

For these and other reasons, there is a need for the present invention.

SUMMARY

The invention relates to the licensing of Java objects. In one embodiment, a computerized system includes a Java object, a license file, and a license manager. The license file is associated with the Java object. The license manager validates the Java object, based on the license file.

Thus, at least some embodiments of the invention provide for advantages not found in the prior art. The Java object is only utilizable in accordance with the terms specified in the license file, which in one embodiment may be encrypted. The license manager, running in one embodiment on a client computer, manages the use of the Java objects. Thus, the license manager may ensure that the Java object is utilized only in accordance with the terms specified in the license file. This mitigates the potential for piracy of the object, and also provides for management of the object in a non-cost-intensive and non-labor-intensive manner.

Besides the advantages, aspects and embodiments of the invention described in the summary, other advantages, aspects and embodiments of the invention will become apparent by reading the detailed description and referring to the drawings. Various embodiments of the invention include computerized systems, methods, computers, and computer-readable media of varying scope.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a computerized system of one embodiment of the invention is presented. In the third section, a computerized method in accordance with an embodiment of the invention is provided. Finally, in the fourth section, a conclusion of the detailed description is provided.

Hardware and Operating Environment

Figure 1:
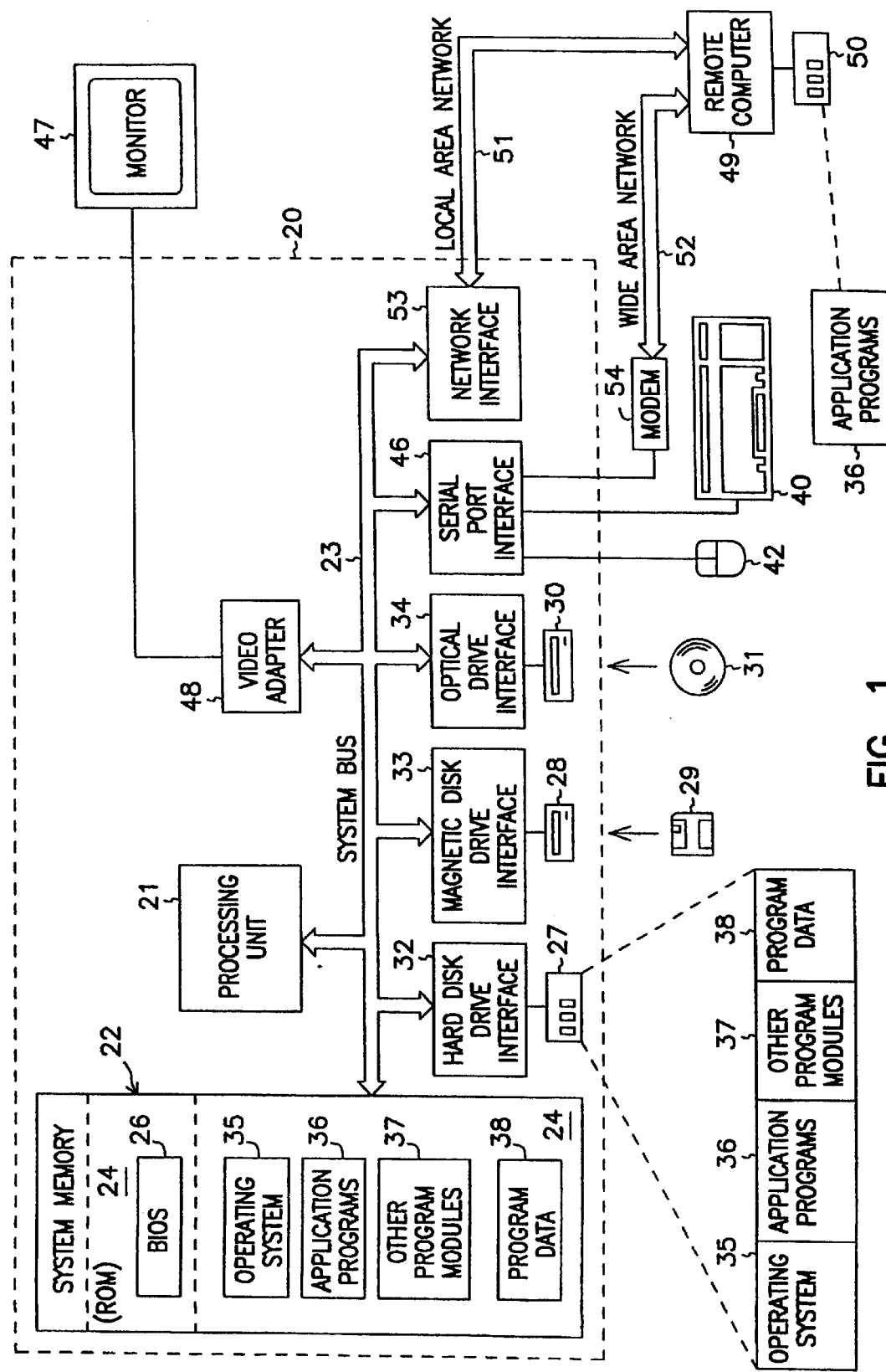
FIG. 1 shows a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

Computerized System

Figure 2:
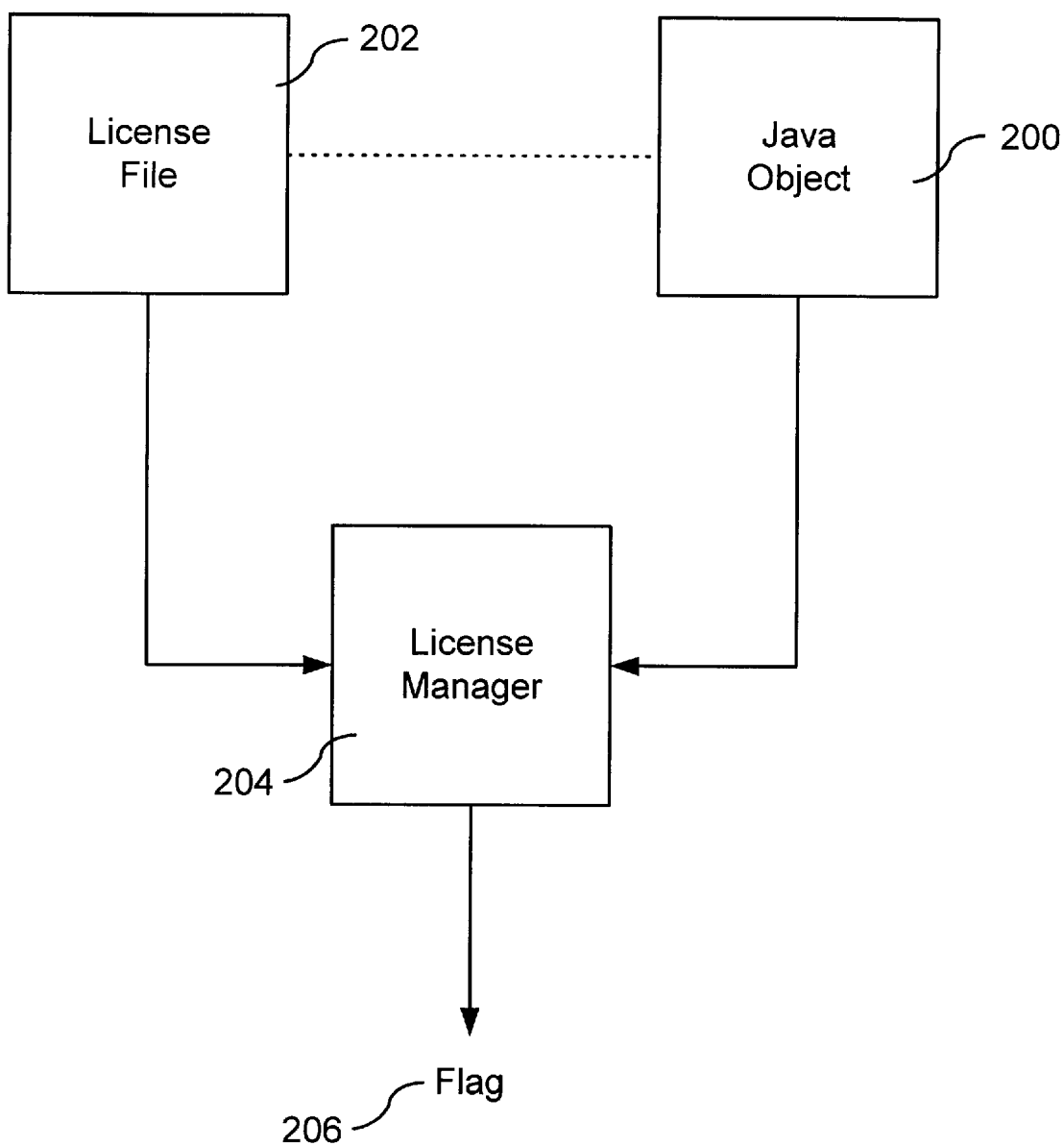
FIG. 2 shows a diagram of a computerized system according to one embodiment of the invention; and, FIG. 3 shows a flowchart illustrating a method according to one embodiment of the invention.

In this section of the detailed description, a description of a computerized system according to an embodiment of the invention is provided. The description is provided by reference to FIG. 2. Referring now to FIG. 2, a computerized system according to one embodiment of the invention is shown. The computerized system includes a Java object 200, a license file 202, a license manager 204, and a flag 206 issued by the license manager 204. In one embodiment, the computerized system is run on a client computer, such as an end user's computer, as opposed to a server computer. Desirably, the client computer is a computer as has been described in the previous section of the detailed description. In one embodiment, the client computer is connected to the Internet, so that it may access one or more server computers.

The Java object 200 is a software component developed in the Java programming language; the invention may not be limited to the use of software components that are Java objects, however. The Java programming language typically provides for the creation of Java objects (such as the Java object 200), such that one or more objects constitute a particular Java program. The objects are precompiled from a source code into a byte code, which at run-time on a specific type of computer running a Java virtual machine are then compiled by a just-in-time compiler into machine code native to the computer. Java objects like the Java object 200 generally provide a given functionality that may be required by different computer programs. Thus, a programmer, rather than having to write code from scratch to perform a given functionality, may instead use a Java object that was pre-written and already tested.

The license file 202 is a file associated with the Java object 200 that provides for the licensing terms regarding the Java object 200. The license file 202 may be a file storable on a computer-readable medium, such as a floppy disk, a hard disk drive, or a compact-disc read-only-memory (CD-ROM). In one embodiment of the invention, the license file is formatted in accordance with the extensible Markup Language (XML) format, as generally described on the Internet at http://www.ucc.ie/xml/. The invention is not so limited, however. Furthermore, the license file may be encrypted in one embodiment of the invention; in such an embodiment, the license manager first decrypts the file. In one embodiment, the encryption is in accordance with RSA techniques known in the art.

The license file 202 may provide for a license of any given type; the invention is not so limited. In one embodiment, the license is a client license, which is a license on a per-class basis that must accompany the class and reside on the client computer. Thus, in an embodiment where the Java object 200 is representative of a specific class of objects, a client license means that any number of instantiations of the object may be run on the client machine. In other words, a client license allows unlimited use of the Java object 200 on a given client computer.

In another embodiment, the license is a CAB license, which is a single license for all the objects contained within a CAB file. A CAB file is a manner by which a number of objects may be distributed and stored. Thus, a CAB license specifies that any object, such as the Java object 200, within a given CAB file, may be utilized on a given client computer. Similarly, in one embodiment, the license is a package license, which is a single license for all the classes contained within a package file. A package file is a manner by which a number of object classes may be distributed and stored. The invention is not, however, limited to CAB files, other types of packaging schema, such as JAR and ZIP files, as known within the art, are also amenable to the invention, as well as future packaging schema. Thus, a package license specifies that any object, such as the Java object 200, within any class within a given package file, may be utilized on a given client computer.

In another embodiment, the license is a roaming license, which is a mechanism for a user-based license. The license is valid only for a particular user, regardless of the given client computer that the particular user is currently using. Thus, as the user changes from computer to computer, he or she is still able to use the Java object 200 specified by the license. In another embodiment, the license is a trial license, which allows for usage of an object for a specific period of time. Once that time has expired, the object may no longer be used. Thus, a user may have an opportunity to try out the Java object 200 that has a license file 202 that includes a trial license.

In another embodiment, the license is a usage license, which allows for only a given number of users to use the object at any one time. Once the maximum number of users is using the object, the object is no longer instantiated. Thus, in the context of an organization having a local-area network (LAN), for example, on which there are 200 users but a usage license that permits only 100 users, once 100 users have instantiated the Java object 200, the other 100 users cannot instantiate the object.

The license manager 204 validates the Java object 200 based on the license file 202. That is, the license manager 204, in one embodiment residing on a client computer, determines whether the Java object 200 may be used on the client computer as permitted by the license specified within the license file 202. For example, in an embodiment where the license file 202 specifies a roaming license, the manager 204 determines whether the user of the client computer matches the user specified in the roaming license. If the users match, then the manager 204 permits the instantiation of the Java object 200. If the users do not match, however, then the manager 204 does not permit the instantiation of the Java object 200. In one embodiment, the license manager 204 is a computer program running on a computer, such as a computer program executed by a processor of the computer from a computer-readable medium such as a memory of the computer. In one embodiment of the invention, upon validating the Java object 200, the license manager 204 issues a flag 206, which is TRUE or VALID if the Java object 200 may be utilized, and FALSE or INVALID if the object may not be utilized.

As has been described in conjunction with FIG. 2, at least some embodiments of the invention provide for advantages over the prior art. The association of a license file with a Java object, along with a license manager, provides for the licensing of Java objects in many different ways. The licensing is managed in a non-cost-intensive and non-labor-intensive manner. Once a developer specifies the licensing terms of a Java object as stored in a license file associated with the Java object, the developer can, for example, put the Java object on an Internet commerce site, such that the Java object may be downloaded and paid for in conjunction with the licensing terms specified in the license file. The developer does not have to personally manage every use of his or her Java objects, but rather is able to rely on the license manager program to ensure that the objects are being used in accordance with the paid-for licensing terms.

Computerized Method

In this section of the detailed description, a computerized method according to an embodiment of the invention is presented. This description is provided in reference to FIG. 3. The computerized method is desirably realized at least in part as one or more programs running on a computer—that is, as a program executed from a computer-readable medium such as a memory by a processor of a computer. The programs are desirably storable on a computer-readable medium such as a floppy disk or a CD-ROM, for distribution and installation and execution on another (suitably equipped) computer.

Figure 3:
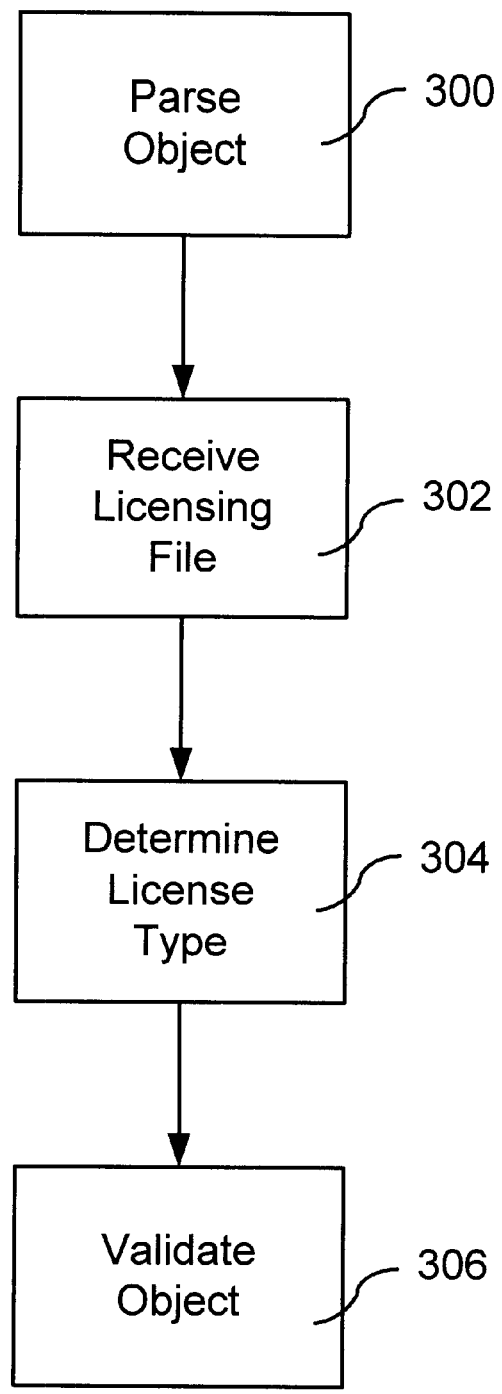

Referring now to FIG. 3, a flowchart of a computerized method according to one embodiment of the invention is shown. In 300, an object, such as a Java object, is parsed. The object is parsed in the case of Java by a Java Virtual Machine. In one embodiment of the invention, the object includes a call to verify whether the object is licensed or not for use on a client computer. For example, the following code in one embodiment calls a license manager to determine if the object may be utilized on the client computer:

```
public class ExampleApplet extends Applet
{
  /**
    * Main entry point for our application. Create a new
      example object
    * and set the initial attributes of the frame.
    */
  public void init( )
  {
    try
    {
```

```
    //
    // validate the license!
    //
    License.validate(getClass( ), "Microsoft", true);
}
catch (LicenseException e)
{
    //
    // license not accepted. dump the message and
    //leave.
    //
    System.out.println(e);
    System.exit(0);
}
```

The developer thus includes this code in his or her Java object. In addition, the developer may encrypt the file to add a level of security. The developer thus places the object and a corresponding license file on a server or distribution medium, from which the client computer receives the object and parses the object in 300.

In 302, once the license manager has been called as a result of 300, a license file associated with the Java object is received, in one embodiment by the license manager. In one embodiment, the license file is encrypted, such that in 302 it is decrypted. In one embodiment, the license file is formatted in XML format, and has the following syntax:

<LICENSE>
    <NAME>Class name that is being licensed</NAME>
    <TYPE>Type of license</TYPE>
    <KEY>The license key</KEY>
    <USAGE>Usage type</USAGE> (optional)
    <SERVER>Validating server</SERVER> (optional)
    <USER>Username</USER> (optional)
    <DATE>Expiration date</DATE> (optional)
    <STYLE>Style of the license</STYLE> (optional)
</LICENSE>
TYPE=CLASS|COMPONENT|CAB|PACKAGE
USAGE=CLIENT|SERVER|ROAMING|TRIAL|USAGE
STYLE=DESIGN|RUNTIME In 304, once the license file has been received, a type of the license file is determined, desirably by the license manager. The license file has at least one type, such as that specified by the <type> tag and the <usage> tag of the license file in the embodiment where the license file is in XML format. In one embodiment, the <type> tag has four different types: class, component, CAB, and package, and the <usage> tag has five different types: client, server, usage, roaming, and trial. With respect to the <type> tag, if the type is class, then the <name> tag specifies the name of a Java class being licensed. If the type is component, the <name> tag specifies the name of a Java component being licensed. If the type is CAB, then the license is applicable to all the Java objects in an associated CAB file, such that the <name> tag is not used. If the type is package, then the <name> tag is the name of the package being licensed. In one embodiment, the default type is class.

With respect to the <usage> tag, information regarding this tag is described in conjunction with 306 below. With respect to the <style> tag, this tag has two types: design and runtime. If the type is design, then the component may be used in conjunction with development tools to create other components and programs, as well as in the running state or mode. If the type is runtime, then the component may only be used when the object is in a running state or mode; that is, the component may not be used in conjunction with development tools. The default type in one embodiment is runtime. Finally, with respect to the <key> tag, this tag specifies a license key that must be valid in accordance with the license manager (i.e., same methodology used to generate a key value based on the other tags, etc.) in order for the Java object to be validated. The various tags of the license file in one embodiment constitute license information of the license file.

Next, in 306, after the type of the license file has been determined, the object is actually validated, desirably by the license manager. In one embodiment, the <usage> tag of the license file is first examined to effectuate validation. If the usage type is client, then the current license file is used to check for licensing information; validation thus includes reading licensing information from the license file. If the type is server, then the <server> tag is used to determine the location of another license file that is then used to read the licensing information; validation thus includes reading licensing information from a server specified within the license file.

If the type is usage, then the <server> tag is checked to determine if the usage limit is currently met; if the limit has not been exceeded, then the license is assumed to be a <server>-type license. Thus, validation includes reading licensing information from a server specified within the license file and determining whether maximum usage of the Java object in terms of number of users has been reached. If the type is roaming, then the <user> tag is checked; if the user is the same as the user currently logged onto the computer, then the Java component or object is permitted to be instantiated. Thus, validation includes determining whether a user specified within the license file matches a user of a computer on which the Java object resides. If the type is trial, then the <date> tag is checked to determine how long the user can use the object. In one embodiment, the default usage type is client. Thus, validation includes determining whether maximum usage of the Java object in terms of length of time has been reached.

In another embodiment of the invention, validation occurs in 306 by first checking the <type> tag of the license file. If this tag is class, then the name of the class being licensed must match the <name> tag; otherwise, the license is invalid. If this tag is package, then the name of the package being licensed must match the <name> tag; otherwise, the license is also invalid. If this tag is CAB, then the name of the CAB being licensed must match the <name> tag; otherwise, the license is invalid.

Next, if the <server> tag is defined, licensing information is received from the server specified in this tag; if the user (client computer) is in an offline mode and not connected to the Internet, this call will thus fail, and the license is invalid. Next, the <key> tag must match the string passed into the license manager's validate methodology (the invention is not limited to a particular methodology). If the tag does not match the string passed, then the license is invalid. That is, a key of the license file is matched with a predetermined key. Matching the key is a manner by which an embodiment of the invention may verify that the license file is valid; the invention is not particularly limited to this manner, however.

If the <key> tag does match, then the <style> tag is checked; if the <style> tag is runtime only and the desired use of the object is not in runtime mode (e.g., development mode), then the license is invalid. Thus, the <style> tag of the license file is examined to determine if it is valid. Next, if the <style> tag is valid, then the <date> tag is checked to determine if a date is specified. If a <date> is specified, then the license is deemed a trial license, such that the date in the license is checked with the current system date; if the system date is later than the date in the license, then the license is invalid. Thus, the license file is examined for a valid date field, and upon finding the valid date field, it is determined whether maximum usage of the Java object in terms of length of time has been reached.

If the <style> tag is valid, then the <user> tag is also checked to determined if a user is specified. If it is, then the licensed user is compared with the user of the client computer; if they are not the same, the license is invalid. Thus, the license file is examined for a valid user field, and upon finding the valid user field, it is determined whether a user specified within the license file matches a user of a computer (e.g., the client computer) on which the Java object resides.

A method according to an embodiment of the invention has been described. Besides the description of the method provided, the method also desirably incorporates the functionality of the system according to one embodiment of the invention that has been provided in the previous section of the detailed description. That is, those of ordinary skill in the art should refer to the previous section of the detailed description when studying the method of this section of the detailed description, to learn of extra functionality that can be provided by the method.

CONCLUSION

Licensing Java objects has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

I claim:

1. A computerized system comprising:
   a software component for execution in an object run-time environment;
   a license file associated with the software component; and
   a license manager to validate the software component based on the license file;
   wherein the license file is selected from the group including at least: a client license file, a CAB license file, a package license file, a server license file, a roaming license file, a usage license file, and a trial license file.

2. The computerized system of claim 1, wherein the license file is formatted in accordance with the XML file format.

3. A computerized method comprising:
   receiving a license file associated with a software component, the license file containing values designating a license type and a usage type of the software component;
   determining the license type of the software component from the license file;
   determining the usage type of the software component from the license file; and
   validating the software component for execution in an object environment in accordance with the values designating license type and usage type contained in the license file.

4. The computerized method of claim 3, wherein the license file designates the usage type of the software component to be a client usage type.

5. The computerized method of claim 3, wherein the license file designates the usage type of the software component to be a server usage type.

6. The computerized method of claim 3, wherein the license file designates the usage type of the software component to be a type allowing a given number of users to use the software component, and validating the software component comprises reading licensing information from a server specified within the license file and determining whether at the time of the validating the given number of users of the software component has been reached.

7. The computerized method of claim 3, wherein the license file designates the usage type of the software component to be a trial usage type and validating the software component comprises determining whether maximum usage of the software component in terms of length of time has been reached.

8. The computerized method of claim 3, wherein validating the software component comprises matching a key of the license file with a predetermined key.

9. The computerized method of claim 3, further comprising after receiving the license file, verifying that the license file is valid.

10. The computerized method of claim 3, wherein receiving the license file comprises decrypting the license file.

11. The computerized method of claim 3, wherein the license file designates the usage type of the software component to be a type allowing use of the software component on a given client computer.

12. The computerized method of claim 3 wherein the license file designates the usage type of the software component to be a type allowing use of the software component by a given user on more than one computer.

13. The computerized method of claim 3, wherein the license file designates the usage type of the software component to be a type allowing use of the software component for a given period of time.

14. The computerized method of claim 3, wherein the license file designates the license type of the software component to be a type allowing use of a plurality of software components contained within a single file.

15. The computerized method of claim 3, wherein the method is performed in response to an instruction to validate being parsed from the software component.

16. A computerized method comprising:
   parsing a software component for execution in an object environment for instruction to validate the software component;
   receiving a license file associated with the software component, the license file having a type;
   determining the type of the license file; and
   validating the software component based on the type of the license file;
   wherein the license file comprises a roaming license file and validating the software component comprises determining whether a user specified within the license file matches a user of a computer on which the software component resides.

17. A computerized method comprising:
   parsing a software component for execution in an object environment for instruction to validate the software component;
   receiving a license file associated with the software component, the license file having a type;
   determining the type of the license file; and
   validating the software component based on the type of the license file;

wherein validating the software component comprises matching a key of the license file with a predetermined key and examining the license file for a valid style.

18. The computerized method of claim 17, wherein validating the software component further comprises examining the license file for a valid date field, and upon finding the valid date field, determining whether maximum usage of the software component in terms of length of time has been reached.

19. The computerized method of claim 17, wherein validating the software component further comprises examining the license file for a valid user field, and upon finding the valid user field, determining whether a user specified within the license file matches a user of a computer on which the software component resides.

20. A computer-readable medium having stored thereon instructions executable on a computer for performing a method comprising:

receiving a license file associated with a software component, the license file containing values designating a license type and a usage type of the software component;

determining the license type of the software component from the license file;

determining the usage type of the software component from the license file; and validating the software component for execution in an object environment in accordance with the values designating license type and usage type contained in the license file.

21. A computerized system comprising:

a plurality of software components for execution in an object run-time environment, each software component having an associated license file; and a license manager to validate each software component based on the associated license file, wherein the associated license files include at least one roaming license file and at least one additional license file selected from the group consisting of: a client license file, a CAB license file, a package license file, a server license file, a usage license file, and a trial license file.

22. A computerized method for validating software components for execution in an object run-time environment, the method comprising:

receiving a license file associated with a software component, wherein the license file is formatted in a mark-up language format and specifies a license type and a usage type for the software component;

determining the license type of the software component from the license file;

determining the usage type of the software component from the license file; and validating the software component based on values in the license file designating the license type and usage type of the license file.

23. The method of claim 22 wherein the license type is selected from the group including at least: class, single component, and multi-component.

24. The method of claim 22 wherein the usage type is selected from the group including at least: client, server, usage, roaming, and trial.

25. The method of claim 22 wherein the determining the license type comprises receiving a mark-up language tag containing license type information.

26. The method of claim 22 wherein the determining the usage type comprises receiving a mark-up language tag containing usage type information.

27. The method of claim 22 further comprising determining the style type of the license file; and wherein validating the software component is further based on the style type of the license file.

28. The method of claim 22, wherein the style type is selected from the group including at least: run-time and design.

29. A computerized method for validating a software component for execution in an object run-time environment with an associated license file, the method comprising:

including in a license file a declaration of restrictions of use of a software component associated with the license file in mark-up language.

30. A computerized method comprising:

receiving a license file associated with an object, the license file containing values designating a license type and a usage type of the object;

determining the license type of the object from the license file;

determining the usage type of the object from the license file; and validating the object for execution in an object environment in accordance with the values designating license type and usage type contained in the license file.

31. A computerized method comprising:

parsing an object for execution in an object environment for instruction to validate the object;

receiving a license file associated with the object, the license file having a type;

determining the type of the license file; and validating the object based on the type of the license file;

wherein validating the object comprises matching a key of the license file with a predetermined key and examining the license file for a valid style.

* * * * *